United States Patent [19]

Flanagan

[11] 4,166,843

[45] Sep. 4, 1979

[54] HIGH YIELD SOLID PROPELLANT HYDROGEN GENERATORS

[75] Inventor: Joseph E. Flanagan, Woodland Hills, Calif.

[73] Assignee: Rockwell International Corporation, El Segundo, Calif.

[21] Appl. No.: 881,491

[22] Filed: Feb. 27, 1978

[51] Int. Cl.$^2$ .............................................. C01B 1/16
[52] U.S. Cl. .................................. 423/648 R; 149/22; 331/94.5 G
[58] Field of Search ................... 423/648 R, 290, 298, 423/345, 439; 149/22; 331/94.5 G; 106/43, 44, 74.4, 74.5

[56] References Cited

U.S. PATENT DOCUMENTS

| | | | |
|---|---|---|---|
| 3,107,187 | 10/1963 | Rumbel et al. | 149/22 |
| 3,170,283 | 2/1965 | Sayles | 149/22 |
| 3,252,842 | 5/1966 | Williams | 149/22 |
| 3,290,190 | 12/1966 | Godfrey et al. | 149/22 |
| 3,313,603 | 4/1967 | Hough et al. | 423/280 |

Primary Examiner—O. R. Vertiz
Assistant Examiner—Wayne A. Langel
Attorney, Agent, or Firm—L. Lee Humphries; Robert M. Sperry

[57] ABSTRACT

A solid propellant gas generator system employing borane compounds of the formula $(CH_3)_x H_{4-x} NB_3 H_8$ as the primary hydrogen source and a metallic complexing agent to trap the carbon molecules as solid metallic carbides.

1 Claim, No Drawings

HIGH YIELD SOLID PROPELLANT HYDROGEN GENERATORS

BACKGROUND OF THE INVENTION

1. Field of the Invention

This invention relates to solid propellant gas generators and is particularly directed to solid propellant hydrogen gas generators formed from ammonium hydrotriborate and alkylammonium hydrotriborate compounds of the formula $R_1R_2R_3NHB_3H_8$.

Chemical lasers operating as HF* systems require a source of $H_2$ for the reaction with F-atoms formed from the combustion reaction of fluorine containing oxidizers and a variety of fuels such as $D_2$, $C_2D_2$, $C_2D_4$ and other deuterated compounds. Solid propellant gas generators which provide only $H_2$ as the gaseous product provide an improved method of $H_2$ storage over gaseous $H_2$.

2. Description of the Prior Art

Solid propellant gas generators which form $H_2$ as the only combustion product have been formulated based upon alkali metal hydrides such as $LiAlH_4$ and $NaBH_4$. However, these systems are limited to a maximum of approximately 8-weight percent yield of $H_2$. Furthermore, alkali metal hydrides are very sensitive to attack by water vapor. Therefore, special precautions must be taken to insure that atmospheric moisture does not come into contact with the solid propellant gas generators containing alkali metal hydrides.

DETAILED DESCRIPTION OF THE INVENTION

The disadvantages of the prior art are overcome with the present invention and a solid propellant is proposed which yields pure $H_2$ as the only gaseous product.

From U.S. Pat. No. 3,313,603 it is learned that a family of compounds with the empirical formula $R_1R_2R_3NHB_3H_8$ have been prepared. This formula can be rewritten as:

$$(CH_3)_xH_{4-x}NB_3H_8$$

for the family of methyl based compounds in which x varies from 1 to 4.

Solid prepellant gas generators are then formulated in which the metallic elements silicon and/or aluminum are added in the proper stoichiometry to complex the carbon present in the form of silicon carbide or aluminum carbide according to the reaction:

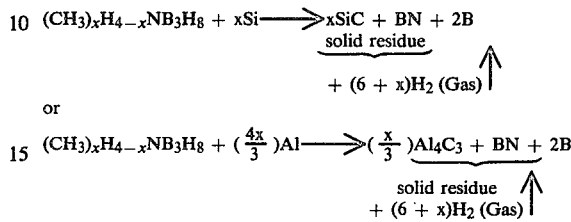

The utilization of silicon and/or aluminum metal to complex the carbon present is extremely critical to the successful operation of an HF* chemical laser. If the metallic additives are absent, methane gas is formed in addition to the hydrogen gas. The laser performance is severely degraded if $CH_4$ is introduced into the laser cavity along with the $H_2$ gas.

Obviously, numerous variations and modifications can be made without departing from the present invention. Accordingly, it should be understood that the forms of the invention described above are illustrative only and are not intended to limit the scope of the present invention.

I claim:

1. A method of generating pure gaseous hydrogen from a solid propellant, comprising the steps of:
   forming said solid propellant by adding a complexing agent selected from the group consisting of silicon and aluminum to a borane compound selected from the group consisting of $(CH_3)H_3NB_3H_8$, $(CH_3)_2H_2NB_3H_8$, $(CH_3)_3HNB_3H_8$, and $(CH_3)_4NB_3H_8$; and
   combusting said solid propellant so as to complex the available carbon molecules with said complexing agents and to generate pure gaseous hydrogen.